US 11,547,106 B2

(12) United States Patent
Acharya et al.

(10) Patent No.: US 11,547,106 B2
(45) Date of Patent: Jan. 10, 2023

(54) SYSTEM FOR INSECT SURVEILLANCE AND TRACKING (71) Applicant: THE JOHNS HOPKINS UNIVERSITY, Baltimore, MD (US)

(72) Inventors: Soumyadipta Acharya, Ellicott City, MD (US); William Patterson, Reisterstown, MD (US); Margaret Glancey, Thurmont, MD (US); Nicholas Radant, Baltimore, MD (US); Justin Chang, Baltimore, MD (US); Kimberly Ashman, New Orleans, LA (US)

(73) Assignee: The Johns Hopkins University, Baltimore, MD (US)

( * ) Notice: Subject to any disclaimer, the term of this patent is extended or adjusted under 35 U.S.C. 154(b) by 328 days.

(21) Appl. No.: 16/479,634

(22) PCT Filed: Jan. 26, 2018

(86) PCT No.: PCT/US2018/015369
§ 371 (c)(1),
(2) Date: Jul. 22, 2019

(87) PCT Pub. No.: WO2018/140679
PCT Pub. Date: Aug. 2, 2018

(65) Prior Publication Data
US 2021/0329902 A1 Oct. 28, 2021

Related U.S. Application Data (60) Provisional application No. 62/451,410, filed on Jan. 27, 2017.

(51) Int. Cl.
A01M 1/02 (2006.01)
A01M 1/10 (2006.01)
(Continued)

(52) U.S. Cl.
CPC ............ A01M 1/026 (2013.01); A01M 1/106 (2013.01); G06V 20/52 (2022.01); G06V 40/10 (2022.01)

(58) Field of Classification Search
CPC ........ A01M 1/026; A01M 1/106; A01M 1/00; A01M 1/02; A01M 1/023; A01M 1/10;
(Continued)

(56) References Cited

U.S. PATENT DOCUMENTS 7,401,436 B2 7/2008 Chyun
7,656,300 B2 2/2010 Ronnau
(Continued)

FOREIGN PATENT DOCUMENTS

WO 2014037936 A1 3/2014
WO 2016064735 A1 4/2016
WO WO-2016168347 A1 * 10/2016 ............. G05B 15/02

OTHER PUBLICATIONS

Snetselaar et al, Development and evaluation of novel contamination device that targets multiple life-stages of Aedes aegypti, Parasites & Vectors (Year: 2014).*
(Continued)

Primary Examiner — Timothy D Collins
Assistant Examiner — Maria E Graber
(74) Attorney, Agent, or Firm — MH2 Technology Law Group, LLP (57) ABSTRACT A mosquito surveillance device includes one or more mosquito traps having a camera capable of taking images of mosquitos and transmitting the images electronically to a receiver. Suitable traps include an ovitrap, for example. Images may be transmitted from inside or outside the trap to a receiver using low bandwidth cellular phone networks. The images are processed and displayed using software forming mosquito data. The images may be analyzed and the
(Continued)

number of live mosquitos identified, the number of dead mosquitos identified, the species of mosquitos identified, or mapped vector densities in real time identified preferably at high resolution.

14 Claims, 6 Drawing Sheets

(51) Int. Cl.
*G06V 20/52* (2022.01)
*G06V 40/10* (2022.01)

(58) Field of Classification Search
CPC ............... A01M 1/12; A01M 2200/01; A01M 2200/012; G06K 9/00362; G06K 9/00771; G06T 7/254; G06T 7/194; G06T 7/168
USPC .............................. 43/107; 340/573.1, 573.2
See application file for complete search history.

(56) References Cited

U.S. PATENT DOCUMENTS

| | | | |
|---|---|---|---|
| 7,921,594 B2 | 4/2011 | Ropiak et al. | |
| 8,054,458 B2 | 11/2011 | Baker | |
| 2002/0144452 A1 | 3/2002 | Beroza | |
| 2002/0185605 A1 | 5/2002 | Shuman et al. | |
| 2002/0121045 A1* | 9/2002 | Hall | A01M 1/026 43/107 |
| 2003/0026484 A1 | 2/2003 | O'Neill | |
| 2004/0093190 A1 | 5/2004 | Beroza et al. | |
| 2004/0216366 A1* | 11/2004 | Ritchie | A01M 1/026 43/114 |
| 2013/0204581 A1 | 8/2013 | Park et al. | |
| 2014/0126802 A1* | 5/2014 | Adiga | G06T 5/004 382/133 |
| 2014/0223802 A1* | 8/2014 | Barrera | A01M 1/106 43/107 |
| 2016/0245916 A1* | 8/2016 | Weber-Grabau | G01B 11/08 |
| 2017/0112116 A1* | 4/2017 | Ji | A01K 29/00 |

OTHER PUBLICATIONS

Buttenheim, et al., Is participation contagious? Evidence from a household vector control campaign in urban Peru. J Epidemiol Community Health. Feb. 1, 2014; 68(2): 103-109.

Kilpatrick, et al., Predicting human West Nile virus infections with mosquito surveillance data. Am J Epidemiol. Sep. 1, 2013;178(5):829-35.

Janz, et al., The Health Belief Model: a decade later. Health Educ Q. 1984 Spring; 11(1):1-47.

Eiras, et al., Development 144of the gravid Aedes trap for the capture of adult female container-exploiting mosquitoes (Diptera: Culicidae). J Med Entomol. Jan. 2014;51(1):200-9.

Ritchie, et al., Field validation of the gravid Aedes trap (GAT) for collection of Aedes aegypti (Diptera: Culicidae). J Med Entomol. Jan. 2014;51(1):210-9.

Wen, et al., Local feature-based identification and classification for orchard insects. Biosystems Engineering. Nov. 2009;104(3):299-307.

Favret, et al., Machine vision automated species identification scaled towards production levels. Systematic Entomology Jan. 2016;41(1):133-143.

De Los Reyes, et al., Detection of Aedes Aegypti mosquito by digital image processing techniques and support vector machine. Region 10 Conference (TENCON), 2016 IEEE.

Martelli, et al., Economic Impact of Dengue: Multicenter Study across Four Brazilian Regions. PLoS Negl Trop Dis. Sep. 2015; 9(9): e0004042.

Eiras, et al., Preliminary evaluation of the 'Dengue-MI' technology for Aedes aegypti monitoring and control. Cad Saude Publica. 2009;25 Suppl 1:S45-58.

* cited by examiner

Fig 2. The ovitrap BG-GAT attracts gravid Aedes aegypti selectively. The trap is widely used for vector surveillance. Our design incorporates a VectorEYES imaging system that automatically captures an image of deceased mosquitos on the mesh periodically. Image quality and illumination is consistently sufficient for the computer vision algorithms and for direct visual counting.

FIGURE 3

Figure 3. (A-D) Computer vision process to count mosquitos. (A) Original image of immobilized mosquitos on the mesh of BG-GAT. (B) Processed binary image. (C) Background-subtracted processed image. (D) Total counts of mosquitos correctly identified by the algorithm.

FIGURE 4

*Figure 4. The algorithm counts the number of mosquitos correctly and identifies Culex with high sensitivity and specificity based on optical and morphological features. (A) The total number of mosquitos from all petri dishes is accurately calculated (purple, n = 93). (B) Preliminary result of Culex identification (green) shows that 31 Culex mosquitos out of 35 are identified with a few false positives. In this image, the sensitivity and specificity of Culex identification are 94% and 86%, respectively.*

FIGURE 5

*Figure 5. Preliminary evidence shows that the algorithm is able to identify individual mosquito heads (yellow boxes) in an overcrowding scenario.*

FIGURE 6: VECTORWEB PRELIMINARY PROTOTYPE, GENERATING A TIME VARYING HEATMAP OF MOSQUITO DENSITIES USING SIMULATED DATA OVERLAID ON LONGITUDE/LATITUDE PAIRS WITHIN RECIFE. THE DATA IN EACH COLUMN, IS REFLECTED AS CHANGES ON THE HEATMAP IMMEDIATELY. THE HEATMAP, ALONG WITH BE AVAILABLE TO HEALTH SYSTEMS. ADDITIONALLY, THRESHOLD BASED ALERTS CAN BE SENT TO INDIVIDUALS THROUGH MASS SMS OR PHONE APPS.

FIG. 6

SYSTEM FOR INSECT SURVEILLANCE AND TRACKING

CROSS-REFERENCE TO RELATED APPLICATIONS

This application is a 35 U.S.C. § 371 U.S. national entry of International Application PCT/US2018/015369, having an international filing date of Jan. 26, 2018, which claims the benefit of U.S. Provisional Application No. 62/451,410, filed Jan. 27, 2017, the content of each of the aforementioned applications is herein incorporated by reference in their entirety.

STATEMENT OF GOVERNMENTAL INTEREST

This invention was made with government support under grant no. AID-OAA-F-16-00091 awarded by USAID. The government has certain rights in the invention.

BACKGROUND OF THE INVENTION

Currently, mosquito surveillance efforts in Brazil, and other countries, are neither timely nor dynamic. Most mosquito surveillance is accomplished by dividing an area into zones and sending an experienced technician to each zone to collect mosquito larvae, set out new adult mosquito traps and bring samples back to be identified and counted in the lab. Mosquito traps are typically only checked weekly and as a result, mosquito population growth data are not immediately available and are time and human-resource intensive to collect. Thus, current lance methods are costly in terms of human resources and time and not easily scalable.

SUMMARY OF THE INVENTION

One embodiment of the present invention is a mosquito surveillance device comprising one or more mosquito traps comprising a camera capable of taking images of mosquitos and transmitting the images electronically to a receiver. Suitable traps include an ovitrap, for example. A suitable camera may be a video recorder or a camera phone, for example. The camera is preferable programmable. Methods of the present invention may transmit images from inside or outside the trap to a receiver using low bandwidth cellular phone networks. A suitable receiver used in the present invention may include a central server, a computer, a laptop, or a cell phone, for example. The receiver is able or transmit the image, or data, to one or more users. The methods of the present invention may include a step wherein the images are processed and displayed using software forming mosquito data. For example, the images may be analyzed and the number of live mosquitos identified, the number of dead mosquitos identified, the species of mosquitos identified, or mapped vector densities in real time identified preferably at high resolution. The mosquito data generated by the present invention may be viewed by one or more health systems or individuals. The software used in the present invention comprises vision algorithms that is able to analyze the images and correctly identity the species of mosquito and count mosquitoes based on the images. For example, the software is able to distinguish species of mosquito found in the images such as *Culex* species and *Aedes/Anopheles*, as examples.

BRIEF DESCRIPTION OF THE DRAWINGS

FIG. 3A-3D illustrates computer vision process to count mosquitos. (A) Original image of immobilized mosquitos on the mesh of BG-GAT. (B) Processed binary image. (C) Background-subtracted processed image. (D) Total counts of mosquitos correctly identified by the algorithm.

FIG. 4A-4B illustrates the algorithm counts the number of mosquitos correctly and identifies *Culex* with high sensitivity and specificity based on optical and morphological features. (A) The total number of mosquitos from all petri dishes is accurately calculated (purple, n=93). (B) Preliminary result of *Culex* identification (green) shows that 31 *Culex* mosquitos out of 35 are identified with a few false positives. In this image, the sensitivity and specificity of *Culex* identification are 94% and 86%, respectively.

DETAILED DESCRIPTION OF THE INVENTION

The present invention and embodiments such s VectorWEB will address the challenges of mosquito surveillance and create a technology and tool that bringing vector surveillance for Zika, and other mosquito borne diseases, into the 21st century. VectorWEB is a novel low-cost, cloud connected system of smart ovitraps (devices that mimic the preferred breeding site for container breeding mosquitoes such as *A. aegypti*) that will provide real-time mosquito surveillance data to health administrators, communities and individuals. It consists of two parts:

VectorEYES, which are existing, evidence based, ovitraps with one simple modification: the addition of low-cost, reprogrammed, camera-phone technology, which converts ovitraps into cloud connected surveillance sensors that transmit images of inside the trap to a central server using low bandwidth cellular phone networks so that mosquitoes can be counted and identified.

Figure 1:
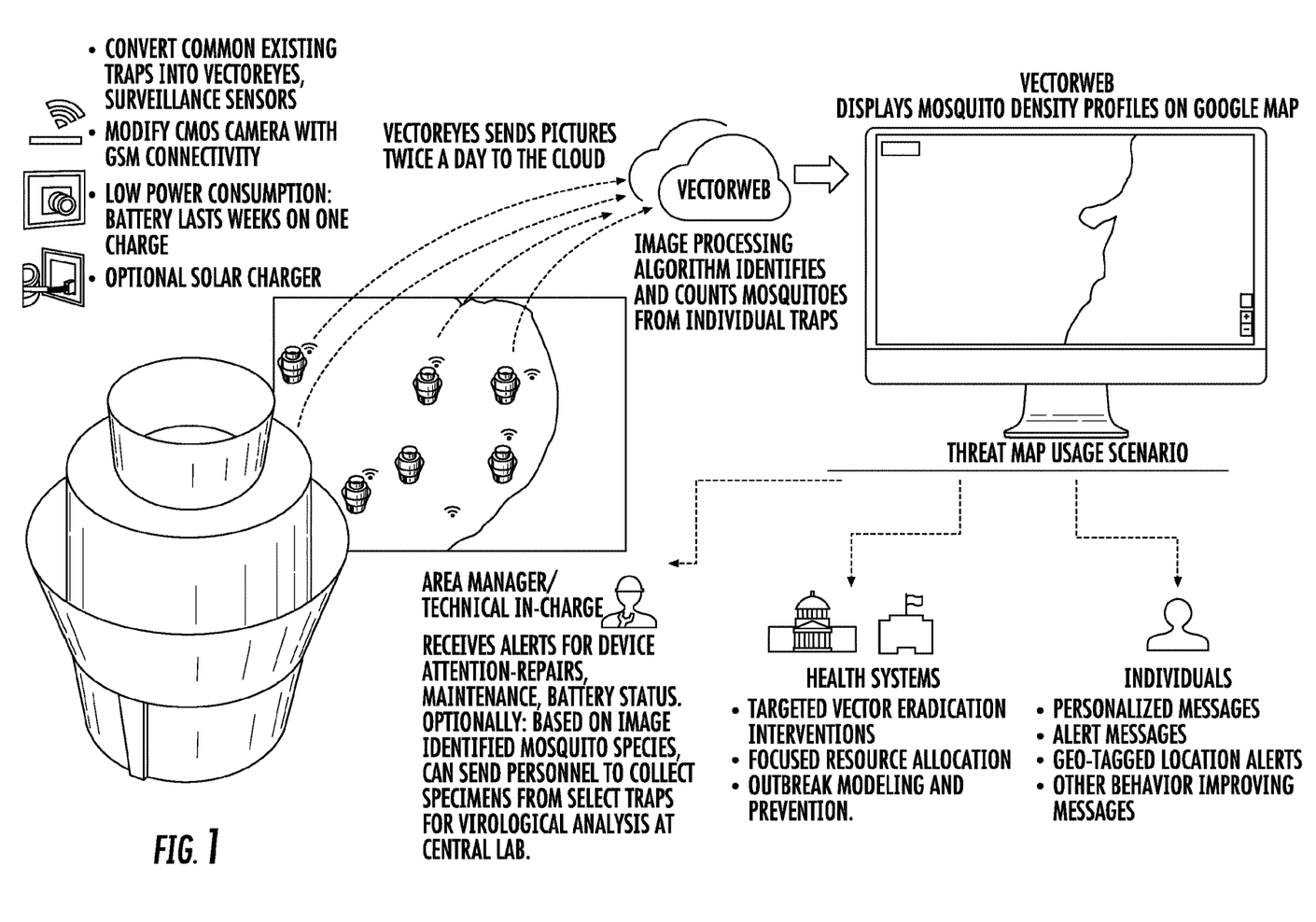
FIG. 1 illustrates one embodiment of a mosquito surveillance system of the present invention.

VectorWEB is a system where data provided by multiple, field deployed, VectorEYES will be processed and displayed using a multi-tiered software ecosystem that allows health systems and individuals to view mapped vector densities in real time at a high resolution. Additionally, media, communities and individuals will be able to receive SMS or app-based alerts of vector density and related risks to inform behavior, similar to how a weather forecast can influence how one approaches their day. FIG. 1 shows a schematic of VectorWEB. Our team has developed preliminary prototypes and demonstrated technical feasibility of all components of this system.

VectorWEB will significantly improve the capacity of health systems to deploy and access mosquito surveillance data. This system will require less human intervention, provide real-time, accessible data and have lower operational costs as compared to current surveillance systems. It will also be rapidly developed and implemented using a "lean startup," iterative design methodology, in which the technological development will progress in parallel with public health implementation and business model validation. Information provided via VectorWEB, will allow public health professionals and communities to: (1) estimate the density of mosquitos in a given place at a given time to target solutions aimed at preventing bites, (2) track the growth of mosquito populations throughout space and time to visualize vector risk and encourage public compliance, and (3) use accurate vector and virus data that are actionable to inform public health resource management and prevent future outbreaks.

The VectorEYE/VectorWEB system is user-friendly, so training of public health surveillance agents, data managers and other end-users will be relatively limited (we estimate that it will require a one-day training followed by initial support visits). Maintenance will require visits to clean the traps of mosquitoes (as is the current practice) as well as replace/recharge batteries and conduct other routine checks. The frequency of such visits will be prompted by individual trap status alerts via the VectorWEB dashboard. We estimate that battery related maintenance will be required once every several weeks (or seldom, in case of optional solar panel powered devices). Mosquito specimen collection will be required in case of excessive overcrowding. Current BG-GAT (Biogents, Gravid *Aedes* Trap) traps collect 10-25 mosquitoes weekly in field deployment scenarios in moderate density areas; therefore we estimate cleaning related maintenance to be needed once every few weeks (which could be less or more depending on mosquito density). This would result in higher resolution and real-time mosquito surveillance data with a substantial decrease in maintenance requirements compared to current systems. The only other recurring requirements will be an ongoing Internet contract with a cellular phone provider.

Once in place and functioning, the VectorWEB software will collate and analyze information from hundreds of deployed VectorEYES including number of new mosquitoes, device functional status and density of *A. aegypti*. This information will be used to populate a Google map with multiple viewing options. Health administrators will see a high-resolution "heatmap" of mosquito density and other modeled parameters such as outbreak risk. Professionals will be able to zoom into block level or individual trap level and zoom out to district and/or provincial level. The district level "trap manager" will have an additional dashboard that provides updates on trap conditions, including service needs or need to collect mosquitoes from high-density traps.

VectorWEB information will be fully accessible by individual citizens, media and communities via text alerts in cases of high-density areas and via free apps (available to the public for download) with access to the full Google map and datasets. These apps will also include targeted reminders of mosquito protective methods and prevention product information. Individual behavior related to personal and environmental protection will be driven via reminder health messages (relating to Zika awareness), risk updates and other behavior change platforms related to eradication efforts visible through VectorWEB in real time. The impact of building platforms for clustering neighborhood engagement in vector control has been shown to be effective in Peru. Additionally, Geographic Information Systems (GIS) has been used by other public health entities, such as the CDC, to publicize geographic surveillance efforts and engage the media regarding diseases such as the flu. Ultimately, VectorWEB represents a significant step forward in surveillance technology: it leads to real-time, publicly available mosquito density information, which can be used for multiple purposes.

At this time, conceptual prototypes of VectorEYES have been developed and installed into a BG-GAT trap. We have proven that it is possible to take images inside of the trap of dead mosquitoes and upload them. Initial computer vision algorithms have been able to correctly identify and count mosquitoes and differentiate between *Culex* species and *Aedes/Anopheles* species, CBID has also simulated mosquito density data in Recife, Brazil and mapped this in Google fusion tables.

Surveillance is an essential piece of any epidemic response as it allows for targeted interventions, effective decision-making related to resource allocation and outbreak modeling (including creation of vector indices). With an estimated 2.2 billion people at risk, VectorWEB addresses the need for convenient, scalable, sustainable and novel approaches (with short pathways to production) to conduct surveillance of mosquito density, limiting the spread of the Zika virus as well as other mosquito-home illnesses associated with a heavy burden of disease, such as Dengue, Yellow Fever, and Chikungunya. The VectorWEB system will transform how current surveillance efforts are conducted and will fill a critical gap in technology that thus far has prevented cost-effective and widespread mosquito density surveillance. The inventors believe that a surveillance system such as VectorWEB would allow health systems to leapfrog critical gaps in current methods. Eventually, VectorWEB data may be combined with data on local suspected infections to better understand the infectious disease dynamics of Zika virus outbreaks.

The impact of surveillance for mosquito-borne illnesses has been proven in multiple contexts. One study on West Nile Virus (WNV)-related mosquito surveillance concluded that standardized mosquito surveillance provides strong predictive power to signal human WNV infection up to several weeks in advance, is correlated with both temporal variation in human WNV cases at local scales and spatiotemporal variation at larger scales, and is a crucial tool for public health officials. Further, with regards to Zika, dengue and chikungunya, the CDC concludes that larval indices may not correlate with adult mosquito abundance and developing useful thresholds of adult mosquitoes requires consistent effort to assure the surveillance indices and their association to human risk is comparable over time. Additionally, behavior models explain that when individuals understand their risk, or see the results of their actions in a timely way, they are more likely to adopt protective behaviors. Thus, when real-time surveillance efforts drive public health epidemic response, time is everything and more precise modeling can make a significant difference in both short- and long-term responses and eventual outcomes. Ultimately, end users of VectorWEB will strengthen and expand their current data collection and analysis processes as well as significantly improve their responses to and use of data through system-driven community engagement and education programming.

Figure 2:
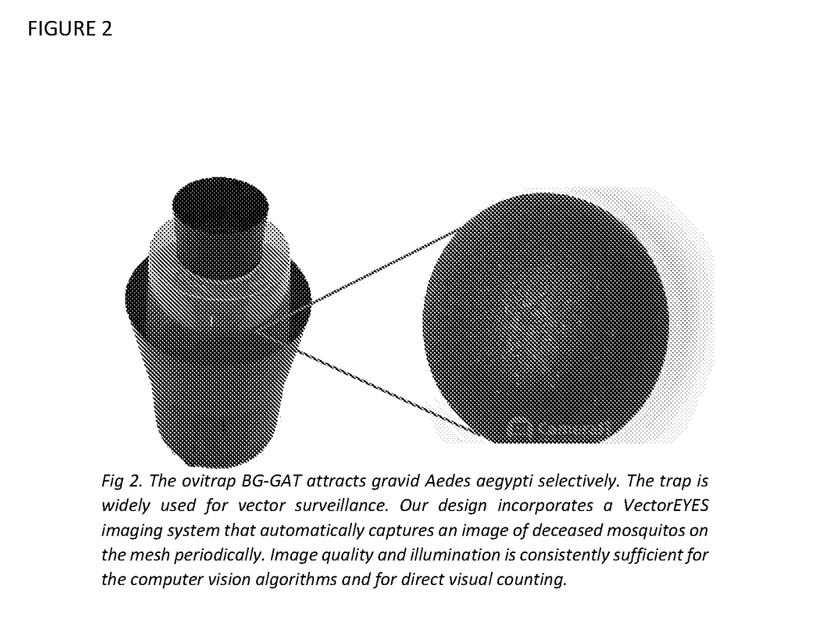
FIG. 2 illustrates an ovitrap BG-GAT attracting gravid *Aedes aegypti* selectively. The trap is widely used for vector surveillance. Our design incorporates a VectorEYES imaging system that automatically captures an image of deceased mosquitos on the mesh periodically. Image quality and illumination is consistently sufficient for the computer vision algorithms and for direct visual counting.

Preliminary prototypes of the VectorEYE/VectorWEB have been developed to prove the technical feasibility of all aspects of the concept. Additionally, each of the technically novel components (such as computer vision aided mosquito identification) is heavily supported by outside research and achievements. The ability of the BG-GAT to selectively capture *Aedes aegypti* has been established by a number of papers and is well accepted by experts. It is widely used and often found in field studies on mosquito density. However, the shortcomings of the BG-GAT are also well established. The requirement of human experts to identify and count the mosquitoes captured is one of the largest challenges faced in vector density surveillance. This is a labor-intensive process that requires regular visits to the traps to manually remove and count the mosquitoes. FIG. 2 shows a preliminary prototype of VectorEYES—a simple modification to the BG-GAT. It is possible to consistently obtain the necessary quality of images of the mosquitoes for the purposes of counting using computer vision techniques. Computer vision is a well-established technology that has grown to be fairly ubiquitous in digital imaging. Facebook and other social media sites can identify faces and offer to tag individuals in a photo. Many digital cameras will highlight the faces of individuals as you focus and take photos. This technology has been extended from humans to insects, and specifically to mosquitoes. The differentiation of various orchard pest species using computers has been shown to be possible. One study showed that it is possible for computer imaging to identify species, and if not species, genus, and that an increase in images to train the program increases the accuracy of the program. This study included 16 genus and 76 species of mosquitoes, and using computer vision techniques was able to accomplish a classification accuracy of 90%, 96%, and 91% for *Aedes, Culex* and *Anoppheles*, respectively, from within 1975 mosquito specimens, thus proving identification of mosquito species is possible using machine vision. Another study demonstrated *Ae. aegypti* specific identification.

Figure 3:
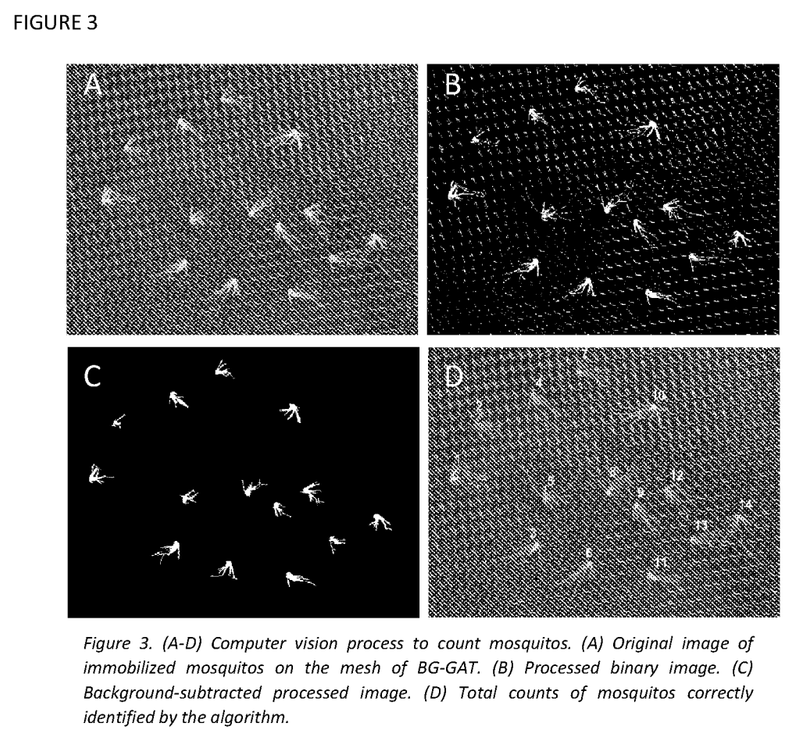
Figure 4:
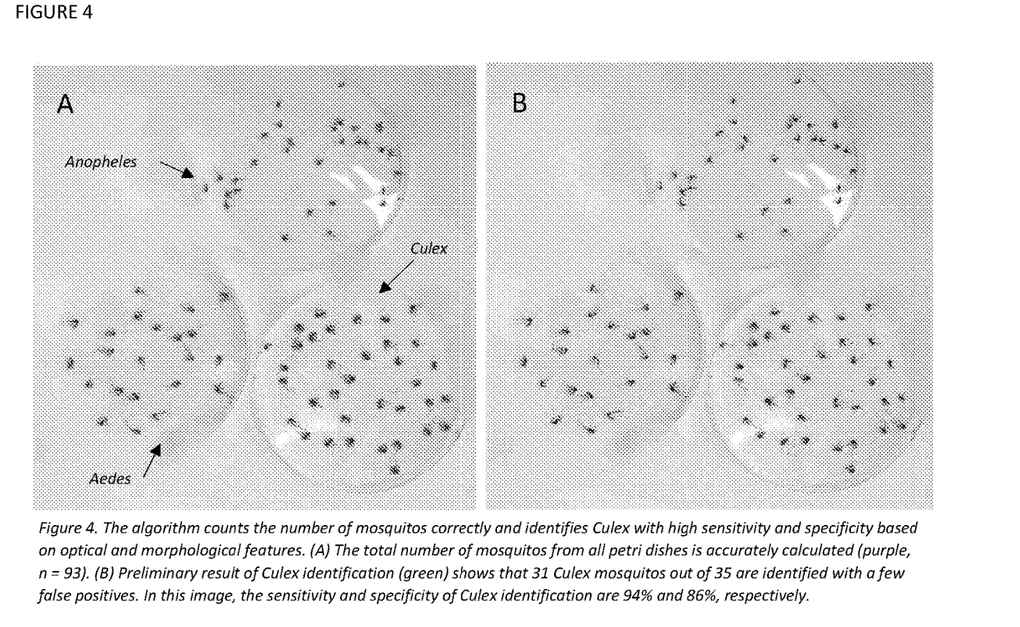
Figure 5:
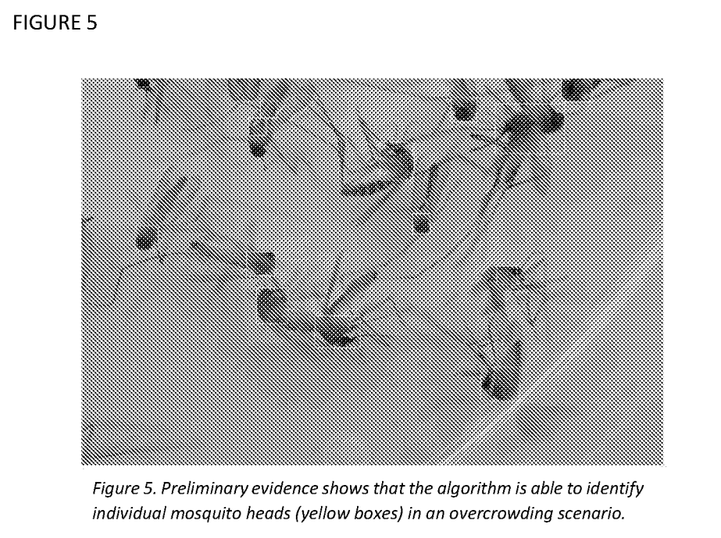
FIG. 5 illustrates preliminary evidence shows that the algorithm is able to identify individual mosquito heads (yellow boxes) in an overcrowding scenario.

FIGS. 3-5 show the steps that have been implemented in the VectorWEB prototype computer vision algorithms. FIG. 3 shows the internal steps of the algorithm in removing the mesh background of the BG-GAT trap, and successfully counting the number of mosquitoes in random orientations. FIG. 4 illustrates an example of computer-vision based counting of all mosquitoes (accuracy 100%), and differential counting of *Culex* mosquitoes (accuracy 91%) from an image that has *Aedes, Anopheles*, and *Culex* mosquitoes in the field of view. It can be speculated that computer-vision techniques might not be robust in counting mosquitoes in a scenario where there is overcrowding and overlap of mosquitoes in the field of view. However, it is well known that current facial recognition algorithms (such as on Facebook photos) can perform reasonably well in tagging individual faces within an image of a crowd. FIG. 5 shows a close up of a field of view with significant overlapping of mosquitoes; the algorithm was able to count total number of mosquitoes with a high degree of accuracy. There would likely be a limit (to the performance of the computer vision algorithm), at which the traps will need to be cleaned out. It should be noted that the images being sent by individual VectorEYES traps will be processed and analyzed on the cloud server hosting VectorWEB; therefore a human expert will always be able to view the raw images themselves (with the computer vision tagging of the individual mosquitoes). Therefore, the human expert (viewing the images on the dashboard) can double-check, correct, or over-ride any count that is reported. As such, as long as the individual mosquitoes are countable on the image, the rate-limiting factor will be the ability of a human to count the number of mosquitoes. Most computer vision techniques will be able to reasonable approximate this accuracy.

Figure 6:
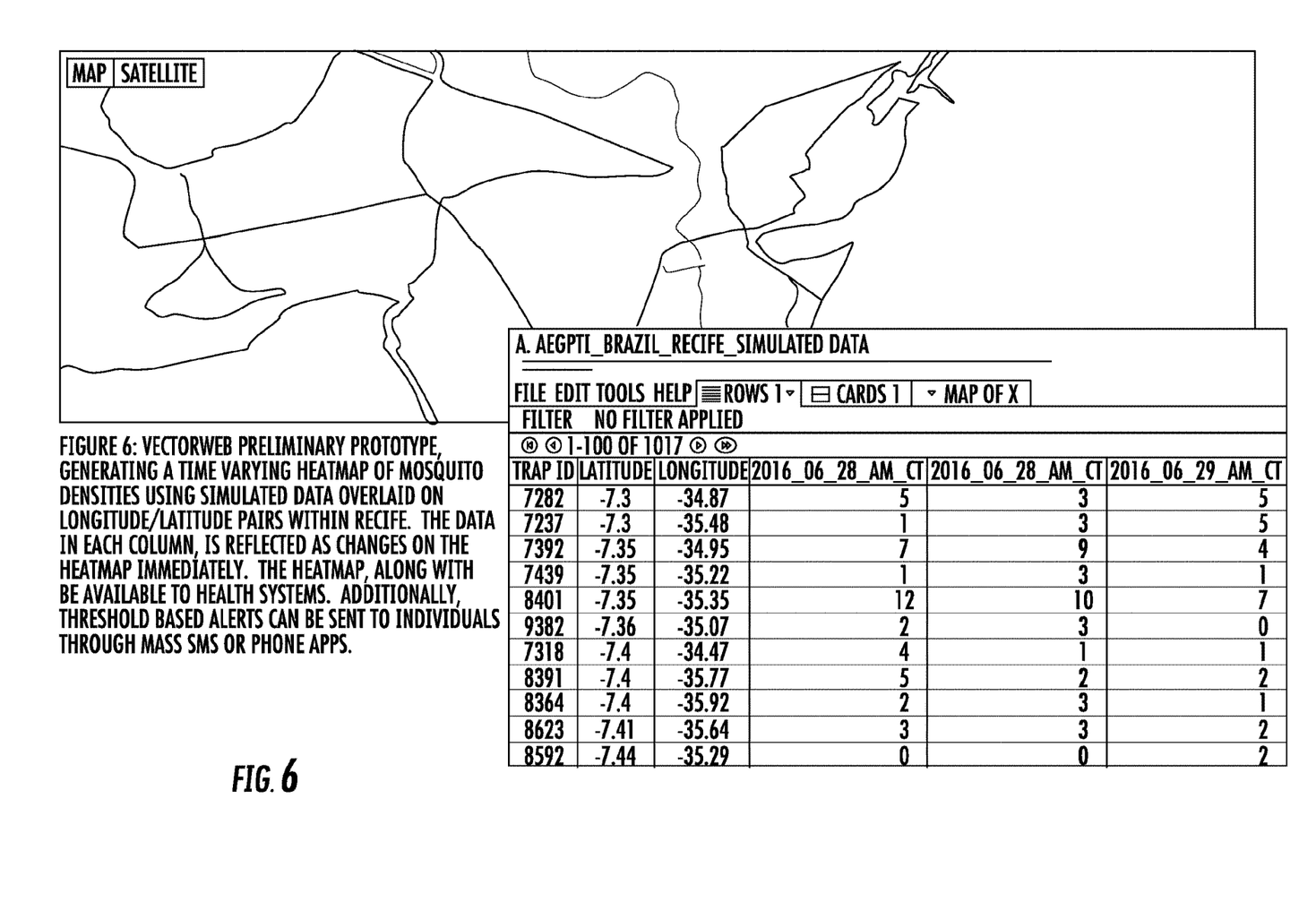
FIG. 6 illustrates VectorWEB preliminary prototype, generating a time varying heatmap of mosquito densities using simulated data overlaid on longitude/latitude pairs within Recife. The data in each column, is reflected as changes on the heatmap immediately. This heatmap, along will be available to health systems. Additionally, threshold based alerts can be sent to individuals through mass SMS or Phone Apps.

The team has also implemented a preliminary software prototype of the map-based visualization of vector densities from multiple VectorEYES. FIG. 6, shows the current method of displaying the maps; using simulated mosquito counts assigned to unique geo-locations within Recife, the team is able to create and replay a time varying map of mosquito densities using Google maps. Based on the density of *Aedes aegypti*, the VectorWEB technology will alert public health organizations and individuals through SMS messages, emails or push notifications through freely downloadable apps. Alerts such as this are common and used for severe weather alerts, UV index alerts, and pollution hazard alerts.

EXAMPLES

Example 1

Prototypes of the present invention using preselected CMOS sensor high-resolution cameras, similar in cost and size to the final product, will be installed in BG-GAT traps and pictures will be taken on a daily basis and uploaded to the cloud platform. Once on the cloud platform, both human d computer algorithm identification of mosquitoes will be used for algorithm improvement and the count data will be geocoded and mapped on the VectorWEB system to generate an interactive heat map.

Example 2

The inventors will place a large number of traps (likely 100-200) throughout Recife, Brazil and integrate this system with the current surveillance system. Data from front traps will be mapped and shared with the public/Municipal government. Qualitative and quantitative studies will be conducted within the surveillance, business and general community.

The strength of VectorWeb not only lies in its ability to provide real-time, targeted data on mosquito density, hut also in the fact that it is low cost and can be rapidly scaled and integrated into existing surveillance and community education systems. Further, it has the potential to result in community entrepreneurship, cost-recovery mechanisms and continued innovation.

The inventors will explore the use of an open-source model in developing VectorWEB that could "democratize" the surveillance technology and empower innovators, entrepreneurs and governments to rapidly build upon each other's efforts. This model has led to transformative innovation and expansion in other products such as the open source Android operating system by Google that has allowed large companies like Samsung as well as small local companies like Micromax to modify, use and improve the platform for all. VectorWEB technology will be sustained as a result of its low cost, improved data collection and quality, resulting in decreased workforce demands, cost-recovery, and entrepreneurship models and continued innovation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A mosquito surveillance device comprising: one or more mosquito traps comprising: a mesh; and a camera capable of taking images of the mesh and mosquitos on the mesh; and a computing system configured to: convert the images to binary images; subtract the mesh from the binary images to produce filtered images; identify a number of the mosquitos in the filtered images that are alive and a number of the mosquitos in the filtered images that are dead wherein identifying the number of mosquitos comprises identifying a number of mosquito heads of the mosquitos when a density of the mosquitos in the filtered images is greater than a predetermined threshold; and generate a time-varying map comprising vector densities of the mosquitos in real time based at least partially upon the number of the mosquitos.

2. The mosquito surveillance device of claim 1 wherein the trap is an ovitrap.

3. The mosquito surveillance device of claim 1 wherein the camera is a camera phone that is programmable.

4. The mosquito surveillance device of claim 1 wherein the computing system is configured to identify one or more species of the mosquitos.

5. The mosquito surveillance device of claim 1 wherein the one or more mosquito traps are configured to transmit the images to the computing system using cellular phone networks.

6. The mosquito surveillance device of claim 5 wherein the computing system is a central server that is able to transmit the images to one or more users.

7. The mosquito surveillance device of claim 1, wherein the computing system is further configured to determine a risk of an outbreak based at least partially upon the time-varying map.

8. The mosquito surveillance device of claim 7, wherein the computing system is further configured to transmit targeted reminders of the time-varying map, the risk of outbreak, or both to an application running on a remote user device to prevent mosquito bites.

9. The mosquito surveillance device of claim 1 wherein the images are processed and displayed using software forming mosquito data.

10. The mosquito surveillance device of claim 9 wherein the mosquito data is configured to be displayed to health systems or individuals.

11. The mosquito surveillance device of claim 9 wherein the software comprises vision algorithms.

12. The mosquito surveillance device of claim 11 wherein the vision algorithms identifies one or more species of the mosquitos.

13. The mosquito surveillance device of claim 11 wherein the vision algorithms count the number of mosquitoes.

14. The mosquito surveillance device of claim 13 wherein the species of mosquito consist of *Culex* species and *Aedes/Anopheles*.

* * * * *